United States Patent Office 2,985,596
Patented May 23, 1961

2,985,596
FINELY POWDERED CHROMIA-ALUMINA DEHYDROGENATION CATALYST AND ITS PREPARATION

Emory W. Pitzer, Bartlesville, Okla., assignor to Phillips Petroleum Company, a corporation of Delaware No Drawing. Filed June 22, 1953, Ser. No. 363,411

1 Claim. (Cl. 252—465)

This invention relates to improved contact masses, to a method of manufacturing the same, and to contacting operations or processes utilizing the improved contact masses. A specific aspect of the invention relates to improved catalysts, their methods of manufacture, and contact process, particularly hydrocarbon conversion processes, utilizing the improved catalysts.

Contact masses are utilized in effecting numerous chemical processes, such as catalyst conversion processes involving the conversion of one compound to another, the reaction of one material with another, the removal of a contaminating material or impurity from a liquid or a gas, illustrated by the removal of water from air, and numerous other contacting operations. Removal of components of a liquid or gas by adsorption on a contact mass having a highly extended available internal surface is a well known contacting operation.

The efficiency of a contact mass in any given process depends upon certain known characteristics as well as characteristics which are not known to the workers in the art. In the separation of fluids by adsorption, it is known that the extent of the available internal surface of the adsorbent determines in part the efficiency of the adsorbent and that the material from which the adsorbent is made is a factor in determining its adsorptive characteristics, but not all of the factors affecting the capacity of an adsorbent are known. In the field of catalysis, it also holds that some of the characteristics of a catalyst contact mass which influence the character of the catalyst are well known and some are unknown to the workers in the art. Just what features of a solid catalyst contact mass make the same an effective catalyst in a specific reaction is not well understood.

There is a continual struggle going on in the chemical field to develop more active, more efficient, and more durable catalysts, yet a great deal of the work in this field is based upon empirical experimentation because of the lack of complete theoretical knowledge as to the characteristics of materials and contact masses which affect the activity, efficiency, and durability of a contact mass or catalyst. The strong incentive to discover or devise improved contact masses is based principally upon the fact that an improved contact mass which effects an improved yield of only one or two percent over known contact masses may result in a saving of hundreds of thousands of dollars in a given field of catalysis. The economic importance of better catalysts, e.g., can well be illustrated by reference to a plant process for the production of butadiene from n-butane in which an alumina-chromia catalyst is utilized to dehydrogenate the n-butane to butenes and butadiene in a butadiene plant which has been producing approximately 6,000 tons of butadiene per month over a period of about ten years. An improvement in the catalyst which effects an improved yield of only a few percent, say 5%, effects additional production of 300 tons per month which is an economic improvement well worth considerable effort in devising improved catalysts.

It is the production of novel and improved contact masses with which this invention is particularly concerned.

The objects of the invention are several and include the following:

To provide a simple method of producing novel and improved contact masses.

To provide novel and improved contact masses.

To provide more efficient contacting processes, such as the conversion of hydrocarbons in contact with catalysts of the invention.

To provide a more efficient process for dehydrogenating hydrocarbons, particularly paraffinic hydrocarbons, and, specifically n-butane.

To provide an improved hydrogenating-dehydrogenating catalyst and a method of preparing the same.

Other objects of the invention will become apparent from a consideration of the accompanying disclosure.

One of the principal aspects of the invention is the preparation of a contact mass for effecting a catalytic reaction or for performing an adsorption process or other contacting operation, comprising "micronizing" (reducing to an average particle size of less than 5 microns) by comminuting the material or materials from which the contact mass is to be made to an average particle size smaller than 5 microns, and thereafter forming the finely comminuted materials into aggregates suitable for contacting operations. This aspect of the invention is well illustrated by reference to the preparation of an alumina-chromia catalyst. In one embodiment of the invention, particulate alumina and chromium oxide are introduced in suitable proportions to a micronizing device such as a ball mill, pulverizer, or other attrition device, where the particle size is reduced by grinding, attrition, or other comminution until the average particle size is less than 5 microns and, preferably, less than 1 micron. During the comminuting step, the materials which are to become the components of the catalyst are thoroughly mixed so as to form an intimate, homogeneous mixture. The materials can also be separately micronized to the required size and then mixed in any suitable mixing device until a homogeneous mixture is obtained. The mixing and/or micronizing may be effected with either dry materials or in the presence of added water or other suitable liquid which is non-deleterious to the contact mass and to the micronizing and aggregate forming processes.

The step of micronizing materials for the contact masses of the invention may also be effected by suspending particles of the desired material or materials, such as alumina and chromia, in a stream of air or other gas in an attrition zone and maintaining the same in a state of agitation and attrition by the suspending and turbulent action of the gas until the desired amount of attrition and reduction in particle size has been obtained. Chromia-alumina catalysts have been made by this technique and have been found to be superior catalysts comparable to the hereinafter described "catalyst A."

After forming an intimate homogeneous mixture of the components of the contact mass in micronized form, the mixture is pelleted into suitable aggregates for contacting operations. Conventional pilling or pelleting methods or other aggregate-forming techniques may be utilized in forming suitable contact masses in instances where the pellets or aggregates are relatively large, such as ¼" by ¼" cylinders, but where pills or pellets ⅛" by ⅛" and smaller are to be formed, it has been found expeditious to first pellet the micronized material into ¼" by ¼" pellets with the aid of a suitable binder and lubricant, such as Sterotex or other combustible binders well known in the art. A difficulty in first pelleting micronized material into small pellets such as ⅛" by ⅛" or ⅛" by ¹⁄₁₆" lies in the poor flowing of the materials into the dies. It has been extremely difficult to flow micronized materials into such dies so as to completely fill the dies before the material is compacted into pellets. By first pelleting the material into larger pellets and crushing or otherwise breaking up the pellets into 30 to 80 mesh particles, the resulting small aggregates can then be easily flowed into pelleting dies so as to form ⅛" by ⅛" or smaller pellets.

In applications requiring fluidized catalyst or contact mass technique, the micronized particles of the invention may be utilized as such or small aggregates, also suitable for this type of process, may be made by grinding pellets formed of micronized particles (in accordance with the invention) to the required size, such as 100 to 200 mesh.

Alumina is a well recognized contacting agent for various types of catalytic chemical reactions as well as for drying and dehydration in general. Alumina is also a well known adsorbent, either alone or in admixture with other materials, for use in separating impurities or undesirable components from gases and liquids. The invention is applicable to the manufacture of alumina contacting agents of the character described. Any of the well known aluminas utilized as contacting agents, such as naturally occurring aluminas or synthetic aluminas, either in the hydrated or dehydrated form, may be finely comminuted in accordance with the invention and formed into superior aggregates for contacting operations. In preparing alumina contact masses from alumina alone or mixed with other materials, it is preferred to grind or otherwise comminute hydrated alumina instead of previously calcined dehydrated alumina. Alumina trihydrate ($Al_2O_3 \cdot 3H_2O$) is an excellent starting material for alumina-containing contact masses. When utilizing a hydrous alumina as the starting material, it is desirable to calcine the material prior to the pelleting step, particularly when the same is admixed with other materials, because the resulting pellets are stronger than are obtained with hydrous alumina present.

The process of the invention produces improved catalysts and contacting agents in all applications where the effectiveness of the contacting agent is dependent upon intimacy of contact between the fluid being contacted and the contacting agent and is applicable to alumina, alone, and admixed with other material. Contact agents formed in accordance with the invention from such materials as $MgO—Cr_2O_3$, $K_2O—Fe_2O_3—Cr_2O_3$, $MoO_3—Cr_2O_3$, $MgO$, $CuO$, activated charcoal, alone, or impregnated with activating agents (Pt, Cu, etc.) are more effective than the conventional forms of these materials.

Alumina is frequently combined with group VIII metal oxides such as Fe, Co, Ni, Pd, and Pt, alone, or in admixture and also in admixture with relatively minor amounts of other oxides such as alkali and alkaline earth metal oxides. Alumina is also frequently combined with the oxides of Cr, Mo, W and U, alone, or in admixture as well as mixed with other metal oxides such as the alkali or alkaline earth metal oxides or the oxides of Be and Mg. The oxides of Mn and V are also frequently combined with alumina, alone, and in admixture with other metal oxides. Silver and copper and/or their oxides admixed with alumina are also well known contacting agents. In some instances, the agent admixed with alumina functions in the reduced state as the elemental metal, in which case it is usually desirable to form an intimate micronized mixture of alumina and the selected metal oxide and subject the pelleted mixture to the desired degree of reduction.

Alumina is frequently combined with silica in practically all proportions of these two components to form catalysts or other contact masses as such, or admixed with other constituents, such as the oxides of Ni, Fe, Co, Cr, Mo, W, U, V, etc. Nickel oxide intimately admixed with silica-alumina is a recently-developed superior catalyst for the polymerization of olefins. This catalyst is also a more effective catalyst when manufactured in micronized form in accordance with the invention. Another nickel-containing catalyst comprises alumina admixed with $Ni_2O_3$ or black NiO. The alumina-$Ni_2O_3$ catalyst is particularly active for the dehydrogenation of cyclohexane and effects considerably less coke deposit and cracking than other nickel oxide catalysts. It is also effective in the dehydrogenation of olefins and di-olefins, in the polymerization of paraffins and olefins, and in the reforming of natural gasoline. Another recently developed unique polymerization catalyst comprises chromia admixed with alumina and/or silica. This catalyst requires at least a portion of the chromium oxide in the hexavalent form, and consequently, it is desirable to utilize $CrO_3$ as the raw material for the chromium oxide of the composite catalyst.

A well-known commercially available platforming catalyst consisting of platinum and HF-treated alumina is manufactured by a combination of precipitation and impregnation operations. This type catalyst can be made in highly active form by preparing a micronized mixture of the constituents and forming the mixture into pills and calcining the pills. Hydrated aluminum oxide, platinum black, and HF or aluminum floride are used advantageously as the materials for forming this catalyst.

Contact masses comprising silica as one of the principal constituents may also be formed, in accordance with the invention, of particles of less than 5 microns average size so as to produce more active and more effective contact masses. The metal oxides referred to as components of alumina-containing composites are also frequently combined with silica, alone, or admixed with alumina to form suitable contact masses. Such contact masses may also be made advantageously from micronized materials of the desired constituent in accordance with the invention. Nickel sulfide, nickel chloride, and also nickel sulfate are suitable metal compounds for combining with silica and/or alumina, to form highly active catalysts or other contact agents. The other group VIII metals and copper may also be used in the same manner as the compounds of nickel just enumerated.

My improved method for preparation of the various contact masses enumerated is particularly effective when applied to the manufacture of chromium oxide-containing hydrogenation-dehydration catalysts. Chromium oxide admixed with alumina, when prepared according to the invention, gives superior results in the dehydrogenation of parffin hydrocarbons, e.g., in the dehydrogenation of n-butane, a catalyst comprising alumina-chromia prepared according to my invention has improved activity, longer catalyst life, lower coke-forming tendency, lower density, and improved crushing strength in comparison to other catalysts of similar composition prepared by other methods. A suitable dehydrogenation-hydrogenation catalyst of this type may be prepared using any conventional proportions of chromia and alumina, however, an amount of chromia (calculated as $Cr_2O_3$) in the range of 10–60 weight percent of the total weight of catalyst is usually used and a catalyst containing chromia in the range of 35–45 weight percent of the composite catalyst is preferred. In manufacturing this particular catalyst any of the aluminas mentioned hereinbefore may be utilized, although alumina obtained by calcining the trihydrate is preferred. The preferred form of chromium oxide is chromium sesquioxide, but chromium trioxide may also be used, in which case the $CrO_3$ is usually converted to $Cr_2O_3$ during the calcination step following the pelleting step.

In accordance with the invention the catalytic or other contact materials are admixed together in the desired proportions and are micronized in a micronizing apparatus such as ball, rod, tube, or hammer mill until the particle size of the material is smaller than 5 microns, preferably, smaller than 1 micron. In either event, a substantial quantity of the ground material is as small as 0.01 micron in size. The micronizing may be carried out either wet or dry without the use of a lubricant with recycling of the coarser particles to the comminution step for further reduction in size. However, if desired, a lubricant may be utilized in the comminution step in which instance the lubricant should be one which facilitates the pilling of the material without deleteriously affecting the comminution. Examples of suitable lubricants are graphite and hydrogenated oils, such as corn oil (Sterotex), peanut oil, cotton seed oil, and the like. The amount of lubricant employed may vary from a few per cent up to approximately 10 weight percent or more of the material being micronized, but amounts which appreciably reduce catalytic activity should be avoided. If combustible lubricant is used in the micronizing step in sufficient quantity, the use of additional lubricant in the pilling step may not be required. After pilling the lubricant is removed by heating the pills in an oxygen-containing atmosphere to a temperature of about 1000° F. in 3 hours and maintaining that temperature for a period of about 20 hours or longer. Combustion of the lubricant at higher or lower temperatures is also feasible but care should be taken not to overheat the catalyst so as to impair its activity.

My chromia-alumina catalyst is used to advantage in the dehydrogenation of any dehydrogenatable hydrocarbon under conditions of temperature, pressure, and reaction time within conventional ranges, such as 900–1300° F., atmospheric pressure up to 500 p.s.i., and 100–5000 gaseous space velocity. This catalyst may be regenerated whenever it becomes insufficiently active by burning off the deposited coke in an oxygen-containing atmosphere, such as air, at a temperature in the range of 900–1300° F. and a gaseous space velocity of 500–5000 volumes of air per volume of catalyst per hour.

In order to more clearly set forth the invention, reference is now made to the preparation of a number of catalysts, one of which is prepared in accordance with the invention, the others representing prior art catalysts, and a comparison in a specific reaction is made between these catalysts.

The following described catalysts A to D, inclusive, were of the composition 40% $Cr_2O_3$–60% $Al_2O_3$ and were formed into ⅛"×⅛" pills in a Stokes BB-2 pilling machine in admixture with 10 weight percent of Sterotex. The Sterotex was removed by heating the pills in air to 1000° F. in 3 hours and continuing the calcination for 20 hours at said temperature.

*Catalyst A—Micronized.*—Hydrated alumina and reagent grade chromium sesquioxide were micronized in a 1 quart size ball mill with 24 "Borundum" cylinders for a period of approximately 15 hours without the use of a lubricant. The micronized material, which was in the form of uniform and discrete particles of an average size of about one micron, was then pilled.

*Catalyst B — Alumina gel plus ammonium dichromate.*—Aluminum nitrate and ammonium dichromate were dissolved in distilled water equivalent to eleven times the weight of the finished catalyst, stirred vigorously, and alumina gel was precipitated by the addition of concentrated ammonium hydroxide until a pH of 7.5 was obtained. The thick slurry was dried without filtering at 225° F. for 40 hours. The dry catalyst was heated in small portions to 470° F. and then calcined at 865° F. for 17 hours. This material was mixed with Sterotex, ground to pass a 50-mesh sieve, and pilled.

*Catalyst C—Thermally decomposed aluminum nitrate and ammonium dichromate.*—Aluminum nitrate and ammonium dichromate were mixed, heated to 495° F. in 2 hours, heated to 820° F. in about 1 hour, and maintained at that temperature for 18 hours. This material was mixed with Sterotex, ground to pass a 100-mesh sieve, and pilled.

*Catalyst D—Thermally decomposed aluminum nitrate and chromium trioxide.*—Aluminum nitrate and chromium trioxide were mixed and heated to 850° F. in about 1 hour and maintained at that temperature for 21 hours. This material was ground to pass a 50-mesh sieve, mixed with Sterotex, and pilled.

*Catalyst E—20%–$Cr_2O_3$–80% $Al_2O_3$ by impregnation of alumina pellets.*—Activated alumina pellets were formed by pelleting calcined hydrated alumina with 10% by weight of Sterotex. The pellets were calcined in a vertical tube furnace at a maximum temperature of 1100° F. at a residence time of about 10 minutes so that approximately 25 to 50% of the binder remained after the calcination. The resulting pellets having a porous outer shell were then dipped in a 30–40% aqueous solution of chromium trioxide so as to deposit the required amount of chromium trioxide in the pellets. The pills were then dried and calcined at approximately 1100° F.

EXAMPLE 1

Catalysts A to E inclusive were tested in alternate 1-hour dehydrogenation and catalyst regeneration periods. During the dehydrogenation period, pure n-butane was dehydrogenated at a temperature of 1050° F., a butane space velocity of about 750 volumes (S.T.P.) per catalyst volume per hour, and atmospheric pressure. The activity of each catalyst and the conversion to coke at catalyst ages of 1 to 5 days are shown in Table I.

*Table I*

| Catalyst | Weight Percent of Butane | |
|---|---|---|
| | Yield | Coke [1] |
| A (Micronized) | 39.9 | 1.3 |
| B ($Al_2O_3$ gel+$(NH_4)_2Cr_2O_7$) | 29.4 | 4.3 |
| C (Thermally decomposed—$(NH_4)_2Cr_2O_7$) | 29.9 | 5.4 |
| D (Thermally decomposed—$CrO_3$) | 31.0 | 3.0 |
| E (Impregnated $Al_2O_3$ pills) | 34.7 | 1.6 |

[1] Coke at 1050° F.

In Table I, the data in the yield column are based on weight percent yield of butene+butadienes adjusted to 80% efficiency. The method of adjusting the efficiency consists in calculating the yield at a selectivity of 80% from experimental data. It is based on the assumption that for a particular catalyst at a specified age the sum of the conversion and selectivity is constant over the relatively narrow range of variations from 80% selectivity experimentally obtained in this work. This assumption has been verified experimentally from temperature-conversion studies made at a constant catalyst age by varying the temperature while all other experimental conditions remained essentially constant. The yield at 80% selectivity is calculated from the experimental results by (1) determining the conversion at 80% selectivity by subtracting 80 from the conversion+selectivity figure, and (2) determining the yield at this selectivity by multiplying the conversion at 80% selectivity by 0.8. The precision of the yield at 80% selectivity is illustrated by the fact that the deviation from the average yield is not greater than 1.0 percentage point.

It is clear from Table I that the catalyst of the invention is superior in activity (conversion to butane and butadiene) and low conversion to coke than the four prior art catalysts B, C, D, and E. It should be noted that catalyst E contains only 20% $Cr_2O_3$ as compared with 40% in the other catalysts. It has been found that an impregnated catalyst made by soaking a preformed alumina pill in an aqueous solution of a chromium compound convertible to the oxide by heating is less active at considerably higher concentrations of chromia than 20 weight percent. Apparently the pores of the alumina become plugged and interfere with intimate contacting of the hydrocarbon and the interior surface of the catalyst when larger proportions of chromia are impregnated in the pills. This is true also of impregnated activated alumina pellets where the chromia is impregnated throughout the pellet. Hence use of catalyst E, containing 20% chromia, is more favorable to this type of catalyst than one containing 40% chromia.

Catalyst E represents a standard commercial butane dehydrogenation catalyst. Over a 100-day life test of catalysts A and E, the activity of catalyst A ranged from about 18 to 27% higher than that of catalyst E as measured by percent of conversion of n-butane to n-butenes and butadiene. A number of other catalyst batches made in accordance with the invention verified this superiority of catalyst A over catalyst E.

EXAMPLE 2

A very active micronized catalyst was prepared by grinding chromia and alumina together in a micropulverizer for a total of ten grindings. Samples of this catalyst were taken after each grinding and activity data were obtained in the dehydrogenation of n-butane under the conditions of Example 1. The data obtained are set forth in Table II.

Table II

| Catalyst | Grindings | Average Particle Size (Microns) | 1-Day Yield | Coke [1] |
|---|---|---|---|---|
| A1 | 0 | 25-35 | 31.3 | 1.17 |
| A4 | 3 | 3-5 | 35.2 | 1.25 |
| A11 | 10 | 0.5-1.0 | 38.6 | 1.48 |

[1] Coke at 1050° F.

The data in Table II demonstrates the relationship that exists between activity and particle size. It is clear that alumina-chromia catalysts made from micronized materials depend directly on fineness of particle size for superior activity.

The alumina-chromia catalyst of the invention, in addition to having higher activity and lower coke-forming tendency in the dehydrogenation of n-butane, also has been demonstrated to have longer catalyst life, lower density, and improved crushing strength in comparison to other catalysts of the same composition prepared by other methods.

It is not known exactly what is responsible for the improved characteristics of the contact masses of the invention over similar contact masses made by conventional methods. It may be that the fineness of particle size alone is responsible for the improved characteristics, but the improvement may well be due to surface characteristics of the minute particles developed by micronizing. At any rate, the catalysts of the invention in which the particulate raw materials have been micronized exhibit advantages in contacting operations when these particles are formed into aggregates over the same materials in conventional particle sizes of a minimum size of about 30 microns. Catalyst activity in many instances is closely related to surface characteristics of the catalytic material and it is logical that the micronizing of particulate catalyst to extremely minute sizes varies the catalyst surface characteristics of the particles.

The foregoing examples are illustrative in nature and should not be interpreted in such a manner as to impose unnecessary limitations on the invention. It should be understood that the theories advanced herein to account for the improved characteristics of the contact masses do not in any way limit the invention.

I claim:

A process for manufacturing a catalyst which comprises micronizing to an average particle size of less than 5 microns a mixture comprising alumina and chromia, pelleting said resulting particles into small aggregates admixed with a combustible binder-lubricant, burning out said binder-lubricant, reducing the resulting pellets to particles of an average size in the range of 30 to 80 mesh, again pelleting the reduced material admixed with a binder-lubricant to pellets smaller than aforesaid pellets, and calcining the smaller pellets so as to remove the binder-lubricant.

References Cited in the file of this patent

UNITED STATES PATENTS

| | | |
|---|---|---|
| 1,345,323 | Frazer et al. | June 29, 1920 |
| 1,371,004 | Slama et al. | Mar. 8, 1921 |
| 2,078,945 | Houdry | May 4, 1937 |
| 2,296,406 | Spicer et al. | Sept. 22, 1942 |
| 2,364,145 | Huppke et al. | Dec. 5, 1944 |
| 2,393,554 | Ogorzaly | Jan. 22, 1946 |
| 2,423,163 | Thomas | July 1, 1947 |
| 2,563,650 | Heineman | Aug. 7, 1951 |
| 2,605,235 | Pitzer | July 29, 1952 |
| 2,650,202 | Hawes et al. | Aug. 25, 1953 |
| 2,664,451 | Owen | Dec. 29, 1953 |
| 2,687,987 | Bennett | Aug. 31, 1954 |
| 2,727,023 | Evering et al. | Dec. 13, 1955 |
| 2,739,996 | Pitzer | Mar. 27, 1956 |

OTHER REFERENCES

Berkman et al.: Catalysis, Reinhold Pub. Co., 330 W. 42nd St., New York, N.Y. (1940), pages 746 and 953.